United States Patent
Bennet et al.

(10) Patent No.: US 12,275,027 B2
(45) Date of Patent: Apr. 15, 2025

(54) IMAGING APPARATUS FOR IMAGING A NOZZLE SECTION OF A DROPLET DISPENSER DEVICE, DISPENSER APPARATUS INCLUDING THE IMAGING APPARATUS, AND APPLICATIONS THEREOF

(71) Applicant: Scienion GmbH, Berlin (DE)

(72) Inventors: Mathieu Bennet, Lyons (FR); Joshua Cantlon-Bruce, Phoenix, AZ (US); Steffen Cosson, Lyons (FR)

(73) Assignee: Scienion GmbH, Berlin (DE)

( * ) Notice: Subject to any disclaimer, the term of this patent is extended or adjusted under 35 U.S.C. 154(b) by 279 days.

(21) Appl. No.: 18/072,864

(22) Filed: Dec. 1, 2022

(65) Prior Publication Data

US 2023/0173519 A1  Jun. 8, 2023

(30) Foreign Application Priority Data

Dec. 2, 2021 (EP) .................................... 21212044

(51) Int. Cl.
*B05B 12/08* (2006.01)
*G02B 21/10* (2006.01)
*H04N 23/74* (2023.01)

(52) U.S. Cl.
CPC .............. *B05B 12/08* (2013.01); *G02B 21/10* (2013.01); *H04N 23/74* (2023.01)

(58) Field of Classification Search
None
See application file for complete search history.

(56) References Cited

U.S. PATENT DOCUMENTS 11,001,087 B2 * 5/2021 Rodriguez ......... G01N 33/4833
2004/0173743 A1 * 9/2004 Valaskovic ........... H01J 49/165
250/288

(Continued)

FOREIGN PATENT DOCUMENTS

WO  WO-2017060164 A1 *  4/2017
WO  WO-2017129390 A1 *  8/2017 ......... G01N 15/0211

(Continued)

OTHER PUBLICATIONS

Morris et al. (1974). Light scattering by bacteria I. angular dependence of the scattered intensity. Proceedings of the Royal Society of London. Series A, 338, 197-208.

(Continued)

*Primary Examiner* — Frederick C Nicolas
*Assistant Examiner* — Michael J. Melaragno
(74) *Attorney, Agent, or Firm* — Caesar Rivise, PC (57) ABSTRACT

Imaging apparatus 10 for imaging nozzle section 21 of droplet dispenser device 20 includes illumination device 11 arranged for creating illumination light directed along illumination axis A1 towards an illumination range configured for accommodating nozzle section 21, and camera device 12 having imaging axis A2 directed to the illumination range. Camera device 12 is configured for collecting nozzle image(s) of nozzle section 21 arranged in the illumination range, wherein illumination device 11 and camera device 12 are arranged for dark field illumination of nozzle section 21. Illumination axis A1 and imaging axis A2 are slanted relative to each other and an illumination angle between axes A1 and A2 is selected such that the at least one nozzle image is collected with a dark background. Furthermore, dispenser apparatus 100 for dispensing droplets on a target and an imaging method for imaging nozzle section 21 of droplet dispenser device 20 are described.

14 Claims, 3 Drawing Sheets

(56) References Cited

U.S. PATENT DOCUMENTS

| | | | | |
|---|---|---|---|---|
| 2006/0152722 A1* | 7/2006 | Northby | ............... | G01P 5/20 |
| | | | | 356/337 |
| 2012/0274760 A1* | 11/2012 | King | ............. | G01N 15/0211 |
| | | | | 348/135 |
| 2013/0256136 A1* | 10/2013 | Muraki | ............. | G01N 15/1429 |
| | | | | 204/555 |
| 2017/0052106 A1* | 2/2017 | Hennig | ............. | G06V 20/698 |
| 2020/0160497 A1* | 5/2020 | Shah | ............. | G06T 7/70 |
| 2020/0402222 A1* | 12/2020 | Shah | ............. | G06T 7/12 |
| 2021/0121871 A1* | 4/2021 | Tourniaire | ............. | G01N 1/2813 |
| 2022/0036531 A1* | 2/2022 | Shah | ............. | G06T 7/60 |
| 2023/0173519 A1* | 6/2023 | Bennet | ............. | B05B 12/08 |
| | | | | 222/52 |

FOREIGN PATENT DOCUMENTS

| | | | | |
|---|---|---|---|---|
| WO | 2017195163 A1 | 11/2017 | | |
| WO | WO-2020094333 A1 * | 5/2020 | ............. | F01N 11/00 |

OTHER PUBLICATIONS

Wei et al. (2007). In situ dark field microscopy for on-line monitoring of yeast cultures. Biotechnol Lett, 29, 373-378.

Extended European Search Report for EP 21212044.8 dated May 23, 2022.

\* cited by examiner

IMAGING APPARATUS FOR IMAGING A NOZZLE SECTION OF A DROPLET DISPENSER DEVICE, DISPENSER APPARATUS INCLUDING THE IMAGING APPARATUS, AND APPLICATIONS THEREOF

FIELD OF THE INVENTION

The invention relates to an imaging apparatus for imaging a nozzle section of a droplet dispenser device, like a piezo-electric droplet dispenser device.

Furthermore, the invention relates to a dispenser apparatus being provided with the imaging apparatus, and to an imaging method for imaging a nozzle section of a droplet dispenser device. Applications of the invention are available in the fields of dispensing droplets, e.g., for investigating and/or processing liquid samples in (bio-) chemistry and biology.

BACKGROUND OF THE INVENTION

In the present specification, reference is made to the following prior art illustrating the technical background of the invention, in particular relating to dispensing droplets of liquid samples and to dark field imaging techniques.
[1] U.S. Pat. No. 11,001,087 B2;
[2] US 2021/0121871 A1;
[3] V. Morris et al. "Light Scattering by Bacteria. I. Angular Dependence of the Scattered Intensity" in "Proceedings of the Royal Society of London. Series A, Mathematical and Physical Sciences" (1974) 338(1613):197-208;
[4] Ning Wei "In situ dark field microscopy for on-line monitoring of yeast cultures" in "Biotechnol. Lett." (2007) 29:373-378; and
[5] WO 2017/195163 A1.

Droplet dispensers are generally known tools for handling small quantities of liquid samples, e.g., for analyzing and/or processing samples, like biological samples, optionally including particles, like cells, cell groups and/or cell components. A droplet dispenser usually comprises a nozzle, like a cylindrical or conical dispensing glass capillary, accommodating the liquid sample to be dispensed and a drive unit creating a pressure pulse for expelling a droplet out of the nozzle. With a typical application, a droplet dispenser is used for placing droplets on a target substrate for sensing sample properties and/or for subjecting the sample to a physical and/or chemical processing. Placing droplets on the target substrate typically comprises compartmentalizing samples (i.e., placing samples in separate substrate compartments), as for cloning applications.

In particular for handling biological samples including a liquid with particles suspended therein, single particle dispensing techniques have been proposed ([1], [2]). These techniques are adapted for placing droplets each with exactly one single particle on the target substrate. With single particle dispensing, typically a camera is used for monitoring a nozzle section near a nozzle opening of the nozzle, in order to detect the presence of one or more particles upstream of the nozzle opening.

Figure 4:
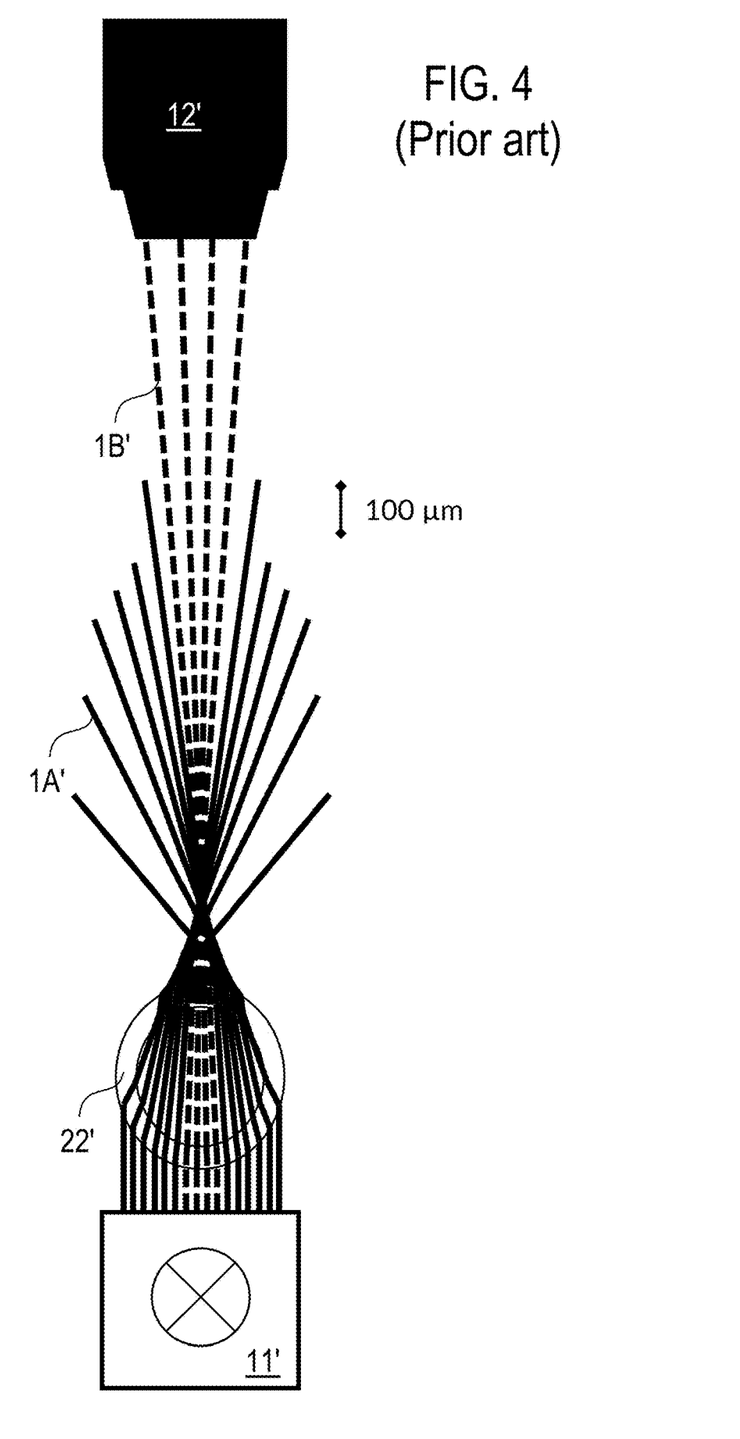
FIG. 4: an illustration of conventional bright field imaging of a nozzle section (prior art).

As schematically shown in FIG. 4 (prior art), a light source 11' is usually arranged for a bright field illumination of the nozzle section 21' from a side opposite to the camera 12'. FIG. 4 shows a cross-sectional view of the nozzle section 21' with a top view of the light rays illuminating the nozzle section 21'. For a particle arranged in a given position in the nozzle section 21' to be imaged by transmission, the light rays from the particle must reach the objective of the camera 12' for obtaining a particle image.

However, the conventional technique of FIG. 4 may have multiple disadvantages which limit the precision and reliability of detecting particles in the nozzle section. As a main disadvantage of the conventional technique, precise detection is typically restricted because the shape of the nozzle section 21' in combination with the bright field illumination results in a highly inhomogeneous sample illumination and inhomogeneous light collection by the camera 12'. The simulation presented in FIG. 4 shows that multiple light rays 1A' (drawn lines) crossing the inner space of the nozzle section 21' cannot be collected by the camera 12' as they are deflected away from the imaging axis of the camera 12'. Only a small portion of central light rays 1B' (dashed lines) can be collected by the camera 12'. By the effect of refraction in the nozzle material, dark and bright areas inside the nozzle section 21' occur in the image collected with the camera 12', wherein particles arranged in the dark areas cannot be detected.

For reducing this disadvantageous effect, the distance between the camera 12' and the nozzle section 21' can be decreased. If the objective is closer to the nozzle section 21', the central bright area is larger, so that more particles can be detected. However, the depth of field is reduced simultaneously. With reduced depth of field, sharp particle images can be obtained around an imaging plane, like a middle plane, only. Particles outside the imaging plane have a bad optical contrast.

As a further disadvantage of the conventional technique, the conventional dispenser imaging technique has limitations of the optical contrast in the imaging plane. Very small particles, like e.g., bacteria, may have a bad optical contrast even if arranged in the imaging plane of the camera 12'. Furthermore, the low contrast may impair the image quality, so that the collected particle images typically include image information on the position, outer shape and size of the particles only, but no further topological details of the particles.

The above disadvantages do not occur with imaging nozzles of a droplet dispenser only, but also e.g., in cell sorters which are used for sorting biological cells in a liquid. Current image-based sorters use bright field, epi illumination [3], and/or reflective light to provide contrast.

As a further technique for optically monitoring biological samples, dark field imaging microscopy is known (see, e.g., [4]). In a regular dark field setup, a high numerical aperture condenser and typically large optical elements are used, which have to be arranged close to the sample being imaged. As a nozzle of a droplet dispenser needs space for motion during operation of the droplet dispenser and a bulky condenser would fill a lot of volume around the nozzle being illuminated, the conventional dark field imaging microscopy is not suitable for nozzle imaging in a droplet dispenser.

Another application of dark field imaging for medical investigations is disclosed in [5], wherein the regular condenser setup is omitted, but replaced by an array of light-emitting diodes (LEDs). Similar to the condenser setup, the LED array needs relatively large space.

OBJECTIVE OF THE INVENTION

The objective of the invention is to provide an improved imaging apparatus for imaging a nozzle section of a droplet dispenser device, wherein disadvantages of conventional techniques are avoided. In particular, the imaging apparatus is to be capable of imaging the nozzle section with increased precision and reliability in detecting particles in the nozzle section, improved optical contrast, improved image quality, reduced inhomogeneity of imaging and/or reduced restrictions of nozzle movements during droplet dispenser device operation. Furthermore, the objective of the invention is to provide a correspondingly improved dispenser apparatus being provided with the imaging apparatus and a correspondingly improved imaging method for imaging a nozzle section of a droplet dispenser device, wherein disadvantages of conventional techniques are avoided.

SUMMARY OF THE INVENTION

The above objectives are solved by an imaging apparatus, a droplet dispenser device and/or an imaging method, comprising the features of the independent claims. Advantageous embodiments and applications of the invention are defined in the dependent claims.

According to a first general aspect of the invention, the above objective is solved by an imaging apparatus, being configured for imaging a nozzle section of a droplet dispenser device. The imaging apparatus comprises an illumination device being arranged for creating illumination light which is directed along an illumination axis towards an illumination range, wherein the illumination range is adapted for accommodating the nozzle section, and a camera device having an imaging axis which is directed to the illumination range, wherein the camera device is configured for collecting at least one nozzle image of the nozzle section arranged in the illumination range.

According to the invention, the illumination device and the camera device are arranged for a dark field illumination of the nozzle section, wherein, in particular at an intersection of the illumination axis and the imaging axis at the nozzle section, the illumination axis and the imaging axis are slanted (or: inclined, arranged at an angle) relative to each other and an illumination angle between the illumination axis and the imaging axis is selected such that the at least one nozzle image is collected with a dark background. Collecting at least one nozzle image with a dark background preferably means that at least one particle in the nozzle appears as a bright particle image in the at least one nozzle image, while the surrounding of at least one particle in the nozzle appears as a darker background, wherein light portions from the surrounding of the at least one particle in particular are zero or neglectable when collecting the at least one nozzle image.

According to a second general aspect of the invention, the above objective is solved by a dispenser apparatus, being arranged for dispensing droplets on a target, comprising a droplet dispenser device having a nozzle section being configured for accommodating a liquid to be dispensed, a drive device being arranged for expelling a droplet from the nozzle section to the target, an imaging apparatus according to the first general aspect of the invention or an embodiment thereof, and a control device being arranged for controlling the drive device in dependency on an output of the imaging apparatus. Preferably, the illumination device is arranged outside a movement range of the nozzle section of the droplet dispenser device.

According to a third general aspect of the invention, the above objective is solved by an imaging method for imaging a nozzle section of a droplet dispenser device. The comprises the steps of creating illumination light with an illumination device and directing the illumination light along an illumination axis toward an illumination range, wherein the nozzle section is arranged in the illumination range, and collecting at least one nozzle image of the nozzle section with a camera device having an imaging axis which is directed to the illumination range.

According to the invention, the illumination device and the camera device are arranged for a dark field illumination of the nozzle section, wherein the illumination axis and the imaging axis are slanted relative to each other and an illumination angle between the illumination axis and the imaging axis is selected such that the at least one nozzle image is collected with a dark background, and the at least one nozzle image includes at least one bright particles image created by at least one particle suspended in a liquid in the nozzle section. Preferably, the imaging method or an embodiment thereof is executed with the imaging apparatus of the first general aspect of the invention or an embodiment thereof.

Preferably, the illumination device comprises at least one light source creating an illumination light beam. The illumination light beam is a parallel beam or a beam with a limited divergence, wherein a lateral extension of the illumination light beam in the illumination range particularly preferred is adapted to the size of the nozzle section in the illumination range. The illumination range is a space where the nozzle section is arranged, in particular in a rest position of the nozzle, where the nozzle section is to be imaged with a resting nozzle.

The dispenser apparatus comprises the nozzle which is preferably made of an optically clear material, like glass or a transparent plastic. The nozzle may have e.g., a cylindrical or conical shape, and it may comprise e.g., a glass capillary. The nozzle may have an inner cross-sectional dimension, like diameter, below 1.5 mm, e.g., in a range from 200 μm to 1.2 mm, and an outer cross-sectional dimension, like diameter, below 2 mm, e.g., in a range from 300 μm to 1.6 mm. The nozzle has a first end connected with a sample reservoir and a second end providing a nozzle aperture. Depending on the imaging task, dispensing task and/or dispenser control process applied, the nozzle section to be imaged is a portion of the nozzle between the first and second ends. Preferably, the nozzle section is closer to the second end than to the first end, particularly preferred, the nozzle section to be imaged is directly adjacent to the nozzle opening. Furthermore, the dispenser apparatus comprises the drive device being configured for driving droplet creation at the nozzle opening, e.g., by creating a pressure pulse for expelling a droplet out of the nozzle. The drive device may comprise, e.g., a piezo-electric drive connected with the nozzle.

Advantageously, by applying dark field illumination for imaging a nozzle, the present invention circumvents the inhomogeneity problem of conventional techniques. The illumination and camera devices are arranged for dark field imaging the nozzle section. In particular, due to the clear transparency of the nozzle material, illumination light is mainly scattered from particles within the nozzle section. The particles act like local light sources before a dark background. The term "dark background" refers to a background of the bright spots in the collected images, which is darker than the bright spots, in particular black and/or nearly black, e.g., completely or mainly determined by surrounding light in the room where the droplet dispenser device is operated. While refraction by the nozzle material still may influence the light scattered by the particles, creation of blind portions of the inner space of the nozzle is avoided in contrast to the conventional imaging setup of FIG. 4. Advantageously, the field of view covers the whole cross section of the nozzle section, so that all particles can be detected.

Thus, the invention enables high contrast imaging of particles, like biological cells, cell components, biological macromolecules and/or cell aggregates in otherwise shaded area of the nozzle. Furthermore, the invention enables detection of sub-micron particles through drastic reduction in background signal that is typical in case of conventional bright field magnification by cylindrical lenses. As a further advantage, the invention enables distortion reduced imaging in particular in cylindrical or conical capillaries, and it does not require lenses or filters for the illumination device hence not obstructing any nozzle motion while preserving the high illumination angle required for dark field illumination.

The term "particle image" refers to a scattering spot and/or a structurally detailed image of the particles. Accordingly, the at least one particle image may include characteristic image details of inner portions and/or surface portions of the particles. The scattering spots may comprise image information on the presence and position of the particle(s) only. The structurally detailed images additionally may comprise topographic information on at least one of a size, shape, surface topography and inner volume topography. Compared with conventional techniques, particle images can be collected with increased image quality. Additionally to information on particle shape and size, further details of the particles can be detected, like details of the particles surface and/or particle volume.

Thus, according to a preferred embodiment of the invention, the at least one particle image includes characteristic image details of inner portions of the particles. Structural features of the particles can be obtained with the inventive imaging technique. In particular, image details of inner portions, like cells or cellular aggregates, can be resolved. Information on inner complexity, e.g. necrotic core, lumen and/or cysts in a cellular aggregate, provides new and extended applications of the conventional dispensing techniques.

Advantageously, the invention provides plural potential commercial and/or scientific applications, e.g., in imaging, sorting, singularization, isolation, discrimination of any type of biological or non-biological particles, like cells or sub-cellular compartments and structures, cell aggregates, organoids, spheroids, biological and synthetic particles, living organisms and/or environmental particles, in the nozzle of a dispensing capillary, and/or liquid handling.

According to a preferred embodiment of the invention, the illumination device is arranged for an asymmetrical illumination, which has no axial symmetry relative to the imaging axis. Particularly preferred, there is also no central symmetry of the illumination relative to the nozzle. The inventors have found that the asymmetrical illumination is sufficient for the task of imaging a nozzle section, in particular for detecting particles therein. The asymmetrical illumination has a particular advantage in terms of reducing space needed for the illumination device.

Particularly preferred, the illumination device is arranged for an illumination of the illumination range exclusively from one side relative to the imaging axis. Advantageously, the complexity of the optical setup is reduced and the full movability of the nozzle is kept with this feature.

Advantageously, the illumination device may comprise a point light source being arranged for creating a single light beam, in particular the illumination device may comprise one single point light source, but no further light sources. The point light source comprises e.g., an LED source or a laser/diode source or alternatively a thermal light source. The single point light source has particular advantages for generating the asymmetrical oblique illumination instead of the conventional condenser used for dark field imaging. Furthermore, employing a single light source has advantages for the droplet dispenser device requiring fast movements of the nozzle in the optical plane, e.g., on a horizontal plane situated at the optical imaging axis height.

According to a further preferred embodiment of the invention, the illumination device is adapted for creating a parallel beam of the illumination light. The parallel beam has advantages in terms of efficient nozzle section illumination and limiting the imaging range on the nozzle section.

With a particularly preferred embodiment of the invention, the illumination device is adjustable for setting the illumination angle. Preferably, at least one light source of the illumination device can be tilted for setting the illumination angle of the illumination beam path. Advantageously, the illumination angle can be adjusted in dependency on at least one of a size of an objective of the camera device, a distance of the objective from the nozzle section, scattering properties of the particles in the nozzle section, determined e.g., by a size and/or granularity of the particles, and a wavelength of the illumination light such that the illumination angle is as small as possible, while the illumination light does not illuminate the objective.

Setting the illumination angle has particular advantages in terms of controlling the dispenser apparatus and in particular the imaging apparatus in dependency on operation conditions of droplet dispensing. As an example, particle size may influence the scattering angle, so that changing the illumination angle may be employed if samples with different particles sizes are dispensed in succession.

If according to a further preferred embodiment of the invention, the illumination angle is adjusted using a control loop in dependency on properties of the at least one nozzle image, an automatic adjustment of the illumination angle can be obtained. The properties of the at least one nozzle image may comprise, e.g., a size, brightness and/or density of detected scattering spots or particle images and/or the background light level. Detected particle images, in particular scattering spots and/or detailed images, may be compared with images of standard scattering particles. Optionally, a calibration of the illumination angle can be done for each new type of nozzle, wherein optimum imaging conditions are selected using images of standard scattering particles.

According to a further preferred embodiment of the invention, the illumination device and the camera device are arranged such the camera device is outside of the illumination range. Accordingly, the illumination light beam is preferably adjusted such that the camera device is arranged outside the illumination light beam, i.e., the illumination light beam is not directly collected or collected with a neglectable extend by the camera device and collecting the at least one nozzle image with a dark background is improved.

Preferably, a beam path of the illumination light from the illumination device toward the illumination range is free of optical components, in particular lenses and/or filters. Advantageously, this reduces unwanted scattering light and saves space for nozzle motions during operation of the droplet dispenser device.

At least one of the imaging apparatus and the dispenser apparatus may be provided with an image processing device being arranged for coupling with the camera device and for receiving and processing at least one nozzle image and/or at least one particle image included in the nozzle images. Preferably, the image processing device is configured for determining at least one of the size, shape, details of the particles surface and details of particle volume. As an example, the image processing device comprises a computer circuit running an image recognition software program, like an information analysis algorithm and/or a machine-learning based analysis software program. The imaging apparatus may be included in the control device.

Features disclosed in the context of the imaging apparatus and the embodiments thereof also represent preferred features of the inventive imaging method and vice versa. The aforementioned aspects and inventive and preferred features, in particular with regard to the execution of the imaging method, therefore also apply for the apparatus. The preferred embodiments, variants and features of the invention described above are combinable with one another as desired.

BRIEF DESCRIPTION OF THE DRAWINGS

Further details and advantages of the invention are described with reference to the attached drawings, which show in FIG. 1: a schematic illustration of features of an imaging apparatus for imaging a nozzle section of a droplet dispenser device according to preferred embodiments of the invention.

DESCRIPTION OF PREFERRED EMBODIMENTS

Features of preferred embodiments of the invention are described in the following with reference to features of dark field imaging of the nozzle section of a droplet dispenser device. Details of droplet dispensing, the droplet dispenser device and the operation thereof are not described as far as they are known per se from prior art techniques.

Exemplary reference is made to employ an illumination device having a single light source only. The invention is not restricted to this embodiment, but can be implemented also with more than one, e.g., two, three, four or more light sources. If multiple light sources are provided, they are preferably arranged in a half space relative to a plane being perpendicular to a nozzle axis and including an imaging axis of the camera device, while the other half space is free of light sources.

Furthermore, exemplary reference is made to employ an illumination device including the single light source, which emits illumination light directly, i.e., without an intermediate optical element along an illumination axis towards the nozzle to be imaged. The invention is not restricted to this embodiment but can be implemented also with an illumination device having at least one optical element, like at least one mirror and/or at least one lens, between the light source and the nozzle to be imaged. For example, at least one optical element can be provided for folding the illumination beam path between the light source and the nozzle and/or for shaping the illumination beam path as a parallel beam or a beam with a cross-section matched to the nozzle size.

Figure 1:
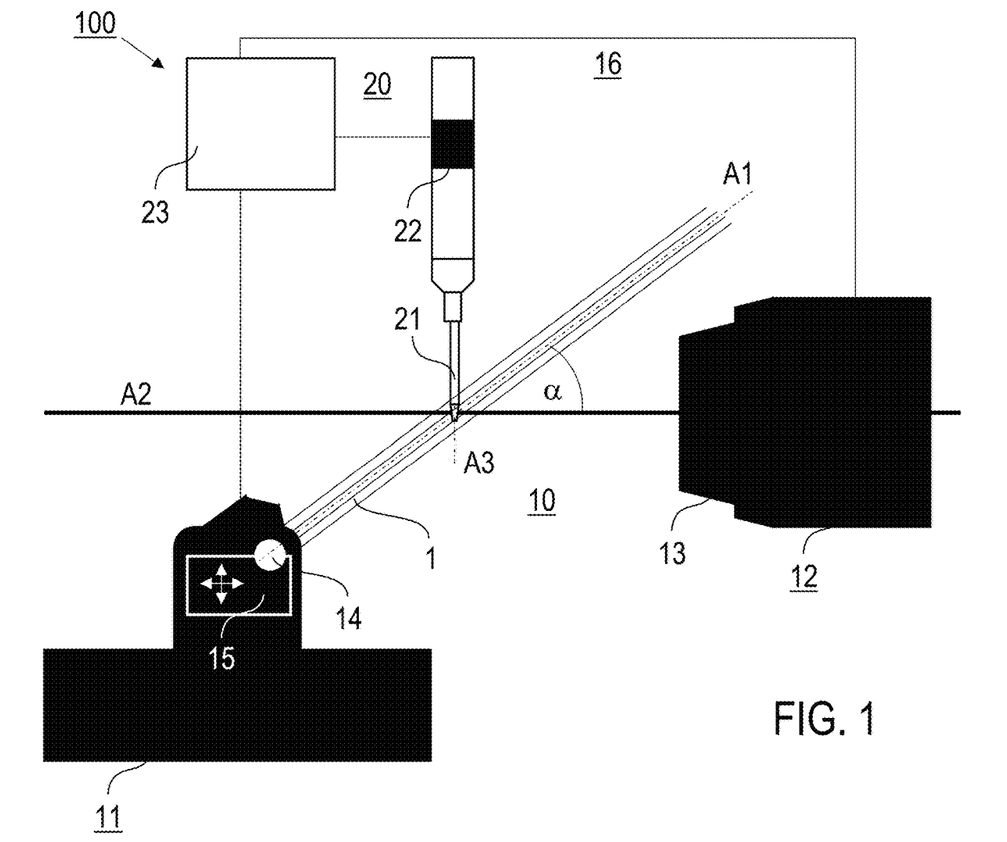

FIG. 1 schematically illustrates an embodiment of a dispenser apparatus 100 comprising an imaging apparatus 10 and a droplet dispenser device 20. The droplet dispenser device 20 is e.g., a piezo-electric dispenser with one or more capillary shaped nozzle(s) (only one nozzle shown in FIG. 1), each with a nozzle section 21 to be imaged and a drive device 22, like a piezo-electric transducer, arranged at an upper portion of the nozzle. The drive device 22 is coupled with a control device 23, like a computer unit, which is arranged for driving the drive device 22. Additionally, the droplet dispenser device 20 comprises a translation stage (not shown) which carries the nozzle and is configured for moving the nozzle between different operation positions of the droplet dispenser device 20, like a monitoring position, where the nozzle section 21 is to be imaged and a dispensing position, where droplets are to be deposited on a target (not shown). As an example, the droplet dispenser device 20 is e.g., the commercially available sciFLEXARRAYER (manufacturer: Scienion GmbH, Berlin, Germany).

Preferably, the nozzle is arranged with a vertical orientation of a longitudinal nozzle axis A3, i.e., the nozzle axis A3 is perpendicular relative to a horizontal plane. A vertical reference plane including the nozzle axis A3 and the nozzle section 21 to be imaged is called optical imaging plane.

The imaging apparatus 10 for imaging the nozzle section 21 of the droplet dispenser device 20 comprises an illumination device 11 and a camera device 12. The illumination device 11 comprises a single point light source 14 supported by a movable carrier 15. The carrier 15 is adapted for tilting the illumination axis A1 and translating the light source 14 in vertical and/or horizontal direction. The light source 14 is e.g., an LED, optionally with an illumination light forming optic, emitting a preferably parallel illumination light beam of illumination light 1 along an illumination axis A1. The light source 14 is adjusted with the carrier 15 such that the illumination axis A1 crosses the nozzle section 21. The portion of the illumination light beam including the nozzle section 21 is also called the illumination range. The distance between the light source 14 and the nozzle section 21 is below 2 cm, e.g., 1.8 cm.

The camera device 12 comprises, e.g., a microscope with an objective 13 and a CCD camera (not shown). The camera device 12 has an imaging axis A2 which is directed to the illumination range and in particular to the nozzle section 21 to be imaged. The objective 13 is adjusted such that a focal plane of imaging is in the optical imaging plane, i.e., in the nozzle section 21. The distance between the objective 13 and the nozzle section 21 is below 2 cm, e.g., 1.7 cm.

The light source 14 is placed below the tip of the nozzle and a horizontal reference plane including the imaging axis A2 and on an opposite side of the nozzle relative to the camera device 12, thus providing an asymmetrical illumination of the nozzle section 21. The position of the illumination device 11 and in particular, the light source 14 allows free movement of the nozzle in the horizontal reference plane. The light source 14 is adjusted such that the angle made by the light rays and the horizontal reference plane, i.e., the illumination angle α between the illumination and imaging axes A1, A2 is as small as possible but large enough that no direct light ray is collected by the objective 13. With a practical example of a diameter of the illumination beam path of 15 mm at 35 mm distance from the point source, the illumination angle α is preferably in a range of e.g., 5° to 20°. The invention is not restricted to this illumination angle range, which may be larger, e.g., above 0° to 75°. The illumination angle α can be modulated with the carrier 15, which preferably is connected with the control device 23. Modulation of the illumination angle α enables minimizing this angle ensuring that a maximum of small angle forward scattered light from a particle inside the nozzle, typically cells and/or cellular aggregates, is collected by the objective 13.

With the control device 23, being connected with the illumination and camera devices 11, 12, a control loop 16 for adjusting the illumination angle α can be implemented. Depending e.g., on size and/or contrast of the spots in the collected images and/or residual scatter light from nozzle walls, the carrier 15 can be controlled such that an illumination angle α is set, which allows optimum image quality.

For illuminating the nozzle section, the illumination light 1 is emitted with the illumination device 11 along the illumination axis A1 toward the illumination range including the nozzle section 21. One or preferably several nozzle images of the nozzle section 21 are collected with the camera device 12 along the imaging axis A2. As both axes A1 and A2 are slanted relative to each other, dark field illumination of the nozzle section 21 is obtained. The nozzle images are collected with a dark background and the nozzle images include bright spots created by the particles suspended in the liquid in the nozzle section 21. Depending on the size of the particles, the bright spots comprise scattering spots or images of the particles.

Figure 2:
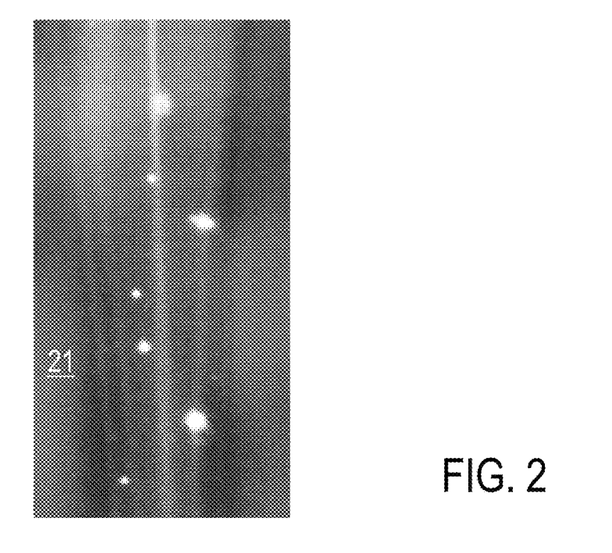
FIG. 2: an example of a nozzle section image collected according to the invention.

As a practical example, FIG. 2 illustrates a dark field image the nozzle section 21 with multiple spheroid particles which are detected in all portions of the nozzle section 21. The spheroids scatter the light and appear bright on a dark background in the image.

Figure 3:
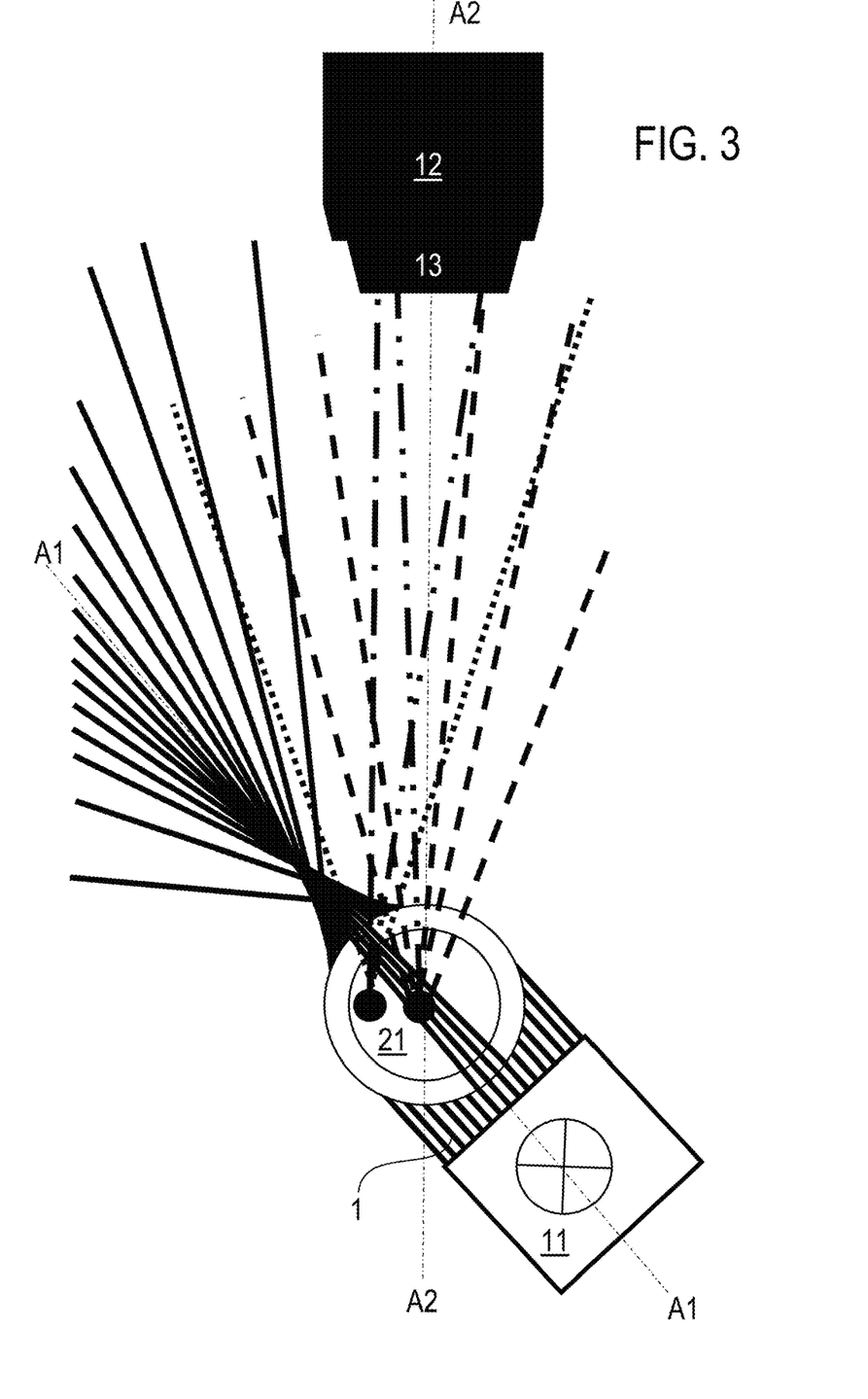
FIG. 3: an illustration of the illumination light beam and scattering light created with the inventive dark field imaging.

FIG. 3 further illustrates the imaging properties of an imaging device 10 according to embodiments of the invention, including the illumination device 11 with the illumination axis A1 and the camera device 12 with the imaging axis A2. FIG. 3 shows a view of the setup in vertical direction, i.e., parallel to the nozzle axis A3 (see FIG. 1). Illumination light 1 is directed along the illumination axis A1 to the nozzle section 21 to be imaged. After transmission through the nozzle section 21, the illumination light (drawn lines) is deflected along various directions by the refractive properties of the nozzle wall material (as shown in FIG. 4). The illumination device 11 and the camera device 12 are arranged such the camera device 12, in particular the objective 13 thereof, is outside of the illumination range and the further paths of the deflected illumination light. Particles within the nozzle section 21 scatter the illumination light 1 according to the particle scatter properties (and possibly depending on the incident light angle), typically in all spatial directions. Light from all particles, in particular being arranged in the center of the nozzle section 21 (scattering in particular in the cone between the dashed lines) or near an inner wall of the nozzle section 21 (scattering in particular in the cone between the dotted or dotted/dashed lines) is collected with the camera device 12.

The features of the invention disclosed in the above description, the drawings and the claims can be of significance individually, in combination or sub-combination for the implementation of the invention in its different embodiments.

What is claimed is:

1. An imaging apparatus, being configured for imaging a nozzle section of a droplet dispenser device, comprising:
   an illumination device being arranged for creating illumination light which is directed along an illumination axis towards an illumination range, wherein the illumination range is configured for accommodating the nozzle section, and
   a camera device having an imaging axis which is directed to the illumination range, wherein the camera device is configured for collecting at least one nozzle image of the nozzle section arranged in the illumination range, wherein
   the illumination device and the camera device are arranged for a dark field illumination of the nozzle section, wherein the illumination axis and the imaging axis are slanted relative to each other and an illumination angle between the illumination axis and the imaging axis is selected such that the at least one nozzle image is collected with a dark background, and
   the imaging apparatus further comprises a control loop being configured for adjusting the illumination angle in dependency on properties of at least one of the at least one nozzle image and the at least one particle image.

2. The imaging apparatus according to claim 1, wherein the illumination device is arranged for an asymmetrical illumination, which has no axial symmetry relative to the imaging axis.

3. The imaging apparatus according to claim 2, wherein the illumination device is arranged for an illumination of the illumination range exclusively from one side relative to the imaging axis.

4. The imaging apparatus according to claim 3, wherein the illumination device comprises a point light source being arranged for creating a single illumination light beam.

5. The imaging apparatus according to claim 1, wherein the illumination device is configured for creating a parallel illumination light beam.

6. The imaging apparatus according to claim 1, wherein the illumination device and the camera device are arranged such that the camera device is outside of the illumination range.

7. The imaging apparatus according to claim 1, wherein a beam path of the illumination light from the illumination device toward the illumination range is free of optical components.

8. The imaging apparatus according to claim 7, wherein the beam path of the illumination light from the illumination device toward the illumination range is free of at least one of lenses, mirrors and filters.

9. A dispenser apparatus, being arranged for dispensing droplets on a target, comprising
   a droplet dispenser device having a nozzle section being configured for accommodating a liquid to be dispensed and a drive device being arranged for expelling a droplet from the nozzle section to the target,
   the imaging apparatus according to claim 1, and
   a control device being arranged for controlling the drive device in dependency on an output of the imaging apparatus.

10. The dispenser apparatus according to claim 9, wherein the illumination device is arranged outside a movement range of the nozzle section of the droplet dispenser device.

11. An imaging method for imaging a nozzle section of a droplet dispenser device, comprising the steps of
   creating illumination light with an illumination device and directing the illumination light along an illumination axis toward an illumination range, wherein a nozzle section of the droplet dispenser device is arranged in the illumination range, and
   collecting at least one nozzle image of the nozzle section with a camera device having an imaging axis which is directed to the illumination range, wherein
   the illumination device and the camera device are arranged for a dark field illumination of the nozzle section, wherein the illumination axis and the imaging axis are slanted relative to each other and an illumination angle between the illumination axis and the imaging axis is selected such that the at least one nozzle image is collected with a dark background, and the at least one nozzle image includes at least one bright particle image created by at least one particle suspended in a liquid in the nozzle section, wherein the steps are conducted with the imaging apparatus according to claim 1.

12. An imaging method for imaging a nozzle section of a droplet dispenser device, comprising the steps of creating illumination light with an illumination device and directing the illumination light along an illumination axis toward an illumination range, wherein a nozzle section of the droplet dispenser device is arranged in the illumination range, and collecting at least one nozzle image of the nozzle section with a camera device having an imaging axis which is directed to the illumination range, wherein the illumination device and the camera device are arranged for a dark field illumination of the nozzle section, wherein the illumination axis and the imaging axis are slanted relative to each other and an illumination angle between the illumination axis and the imaging axis is selected such that the at least one nozzle image is collected with a dark background, the at least one nozzle image includes at least one bright particle image created by at least one particle suspended in a liquid in the nozzle section, and the ingle is adjusted using a control loop in dependency on properties of at least of the at least one nozzle image and the at least one particle image.

13. The imaging method according to claim 12, further comprising the step of adjusting the illumination angle in dependency on at least one of a size of an objective of the camera device, a distance of the objective from the nozzle section, scattering properties of the particles in the nozzle section and a wavelength of the illumination light such that the illumination angle is as small as possible, while the illumination light does not illuminate the objective.

14. The imaging method according to claim 12, wherein the at least one particle image includes characteristic image details of inner portions of the particles.

\* \* \* \* \*